United States Patent
Yu et al.

(10) Patent No.: US 8,675,044 B2
(45) Date of Patent: Mar. 18, 2014

(54) METHOD FOR PLAYING IMAGES ACCORDING TO A DATA COMPARISON RESULT AND IMAGE PLAYBACK SYSTEM THEREOF

(75) Inventors: Yi-Ju Yu, Taipei Hsien (TW); Shih-Lin Chiu, Taipei Hsien (TW); Wen-Chin Wu, Taipei Hsien (TW)

(73) Assignee: Wistron Corporation, Hsichih, New Taipei (TW)

( * ) Notice: Subject to any disclaimer, the term of this patent is extended or adjusted under 35 U.S.C. 154(b) by 1230 days.

(21) Appl. No.: 12/343,362

(22) Filed: Dec. 23, 2008

(65) Prior Publication Data
US 2010/0066819 A1    Mar. 18, 2010

(30) Foreign Application Priority Data
Sep. 12, 2008  (TW) ................ 97135037 A

(51) Int. Cl.
*H04N 13/00*       (2006.01)
(52) U.S. Cl.
USPC ............... 348/42; 352/86; 359/462; 396/324
(58) Field of Classification Search
USPC ................. 348/42; 352/86; 359/462; 396/32
See application file for complete search history.

(56) References Cited

U.S. PATENT DOCUMENTS

| 6,157,351 A | 12/2000 | Olson |
| 6,285,368 B1 * | 9/2001 | Sudo ............................. 345/419 |
| 2001/0043266 A1 * | 11/2001 | Robinson et al. ............... 348/53 |
| 2006/0061652 A1 * | 3/2006 | Sato et al. ....................... 348/53 |

FOREIGN PATENT DOCUMENTS

| JP | 1175223 | 3/1999 |
| TW | 278301 | 6/1996 |
| TW | 097134826 | 9/2008 |

OTHER PUBLICATIONS

Office action mailed on Nov. 29, 2011 for the Taiwan application No. 097135037, p. 2 line 1~18 and line 20~25 and p. 3 line 1~4 as well as line 6~10.

* cited by examiner

*Primary Examiner* — Jude Jean Gilles
*Assistant Examiner* — Jaren M Means
(74) *Attorney, Agent, or Firm* — Winston Hsu; Scott Margo

(57) ABSTRACT

An image playback method includes starting an image display module, detecting glasses data in a predetermined range, comparing the detected glasses data with a set of data to generate a first comparison result, and the image display module playing a 3D image or a 2D image according to the first comparison result.

21 Claims, 2 Drawing Sheets

METHOD FOR PLAYING IMAGES ACCORDING TO A DATA COMPARISON RESULT AND IMAGE PLAYBACK SYSTEM THEREOF

BACKGROUND OF THE INVENTION

1. Field of the Invention

The present invention relates to an image playback method and an image playback system thereof, and more specifically, to an image playback method for playing 3D images according to a data comparison result and an image playback system thereof.

2. Description of the Prior Art

Generally, 3D images are transmitted as left eye images and right eye images viewed by the left eye and the right eye, respectively. The images received by the two eyes are matched as a 3D image that has focal range and gradation according to a discrepancy between visual angles of the two eyes. Some common methods utilized for generating 3D images include polarizing glasses, shutter glasses, an anaglyph, and an auto-stereoscopic display. The related description for the methods is provided as follows.

Polarizing glasses utilize a horizontal polarization lens and a vertical polarization lens disposed on the left lens and the right lens of a pair of glasses, respectively, so that the user's left eye and right eye only view horizontally polarized beams and vertically polarized beams, respectively. The display apparatus sequentially projects the horizontally polarized beams and the vertically polarized beams for reception by the left eye and the right eye, respectively, and then the 3D images are matched by vision persistence in the user's brain.

Shutter glasses sequentially open the left lens and the right lens of a pair of glasses. When the right lens is open, right eye images may be transmitted to the right eye from a display screen at the same time. When the left lens is open, left eye images may be transmitted to the left eye from the display screen at the same time. The method is commonly used in I-MAX movie theaters or 3D theaters. In addition, switching speed of the left lens and the right lens needs to be very fast for preventing twinkle in the 3D images. In general, the user may feel comfortable at a switching speed of over sixty times per second.

An anaglyph utilizes a left filter and a right filter to perform a color filtering process. Thus, the anaglyph may allow the left eye and the right eye to view images of a single color and different visual angles respectively for generating the 3D images by vision persistence in the user's brain.

An auto-stereoscopic display allows the user to view 3D images without wearing a pair of 3D glasses. Common methods include an e-holographic method and a volumetric method. The e-holographic method involves utilizing an RGB laser source passed through an acoustic optical modulator for generating a phase grating. Subsequently, after the laser beams with the grating information are combined into a hologram, vertical and horizontal scanning may be performed via a vertical scanning mirror and a polygonal mirror so as to generate the 3D images. The volumetric method involves utilizing a laser light source to transmit light to a round plate with fast rotation for generating scattering of the light. In such a manner, every point in a 3D space may be scanned via scattering of the light so that 3D images may be generated accordingly.

As mentioned above, both 3D image displays using specific glasses and the auto-stereoscopic display viewed with the naked eye are inconvenient in use. For 3D glasses, before viewing 3D images, the user may not only need to wear a pair of corresponding 3D glasses first, but may also need to execute related software and hardware operations, such as performing a manual switch between a 2D image display mode and a 3D image display mode. For the auto-stereoscopic display, take a 3D display mobile phone produced by SAMSUNG, e.g. an SCH-B710 type, as an example. Although the 3D display mobile phone may allow the user to view 3D images without wearing a pair of 3D glasses, the user may still need to rotate the phone screen manually to switch the 3D display mobile phone to the 3D display mode.

SUMMARY OF THE INVENTION

The present invention provides an method for playing images according to a data comparison result, the method comprising: starting an image display module; detecting glasses data in a predetermined range; comparing the detected glasses data with a set of data to generate a first comparison result; and the image display module playing a 3D image or a 2D image according to the first comparison result.

The present invention further provides an image playback system capable of capturing glasses contour images, the image playback system comprising an image capturing module comprising a contour capturing device for capturing a glasses contour image in a predetermined range; a first storage device for storing a set of contour image data corresponding to at least one pair of 3D glasses; and a comparing device for comparing the glasses contour image in the predetermined range captured by the contour capturing device with the set of contour image data to generate a first comparison result; and an image display module comprising a display device for playing a 3D image or a 2D image; and a control device for controlling the display device to play the 3D image or the 2D image according to the first comparison result transmitted from the comparing device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
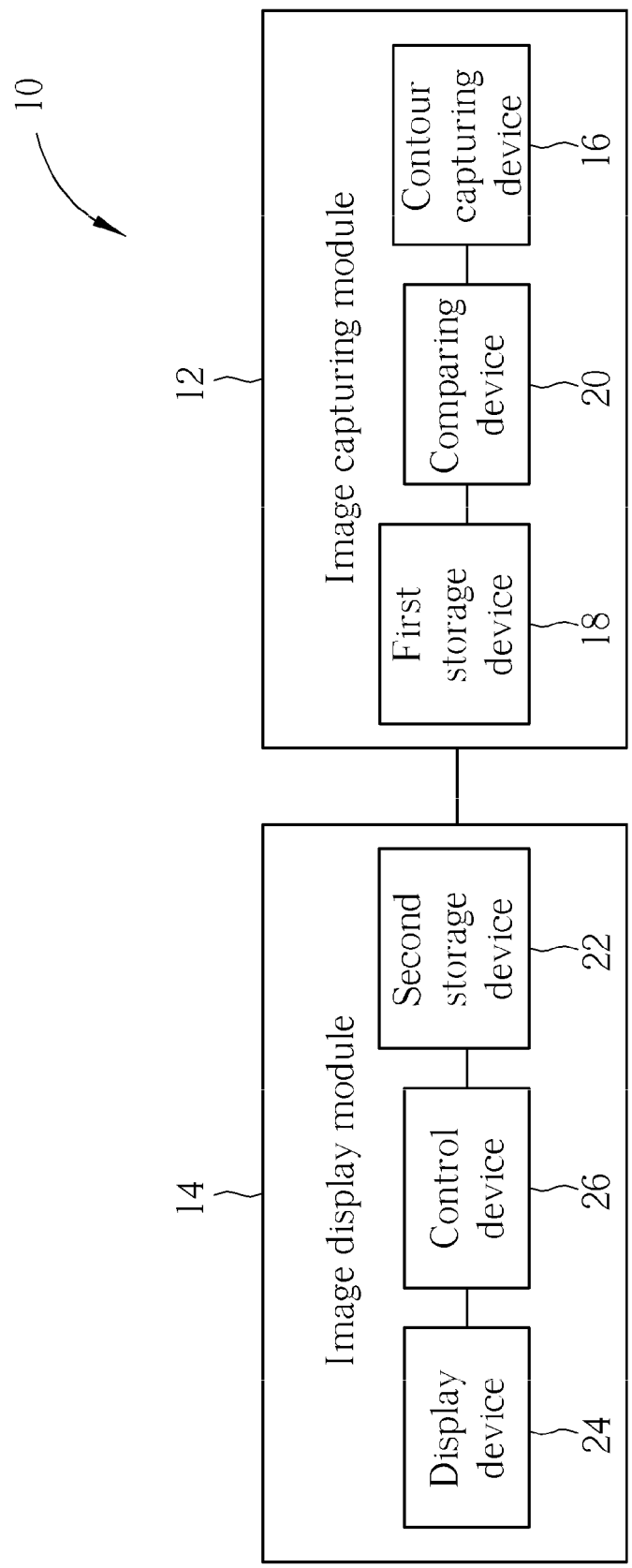
FIG. 1 is a functional block diagram of an image playback system according to one embodiment of the present invention.

Please refer to FIG. 1, which is a functional block diagram of an image playback system 10 according to one embodiment of the present invention. The image playback system 10 comprises an image capturing module 12 and an image display module 14. The image capturing module 12 comprises a contour capturing device 16, a first storage device 18, and a comparing device 20. The image capturing module 12 may be a common image capturing apparatus, such as a webcam. The contour capturing device 16 is used for capturing a glasses contour image in a predetermined range. The contour capturing device 16 may be an image capturing lens of the webcam. The first storage device 18 is used for storing a set of contour image data corresponding to at least one pair of 3D glasses. The comparing device 20 is used for comparing the glasses contour image captured by the contour capturing device 16 with the set of contour image data to generate a first comparison result. The comparing device 20 may be a contour image comparing software. The image display module 14 may be connected to the image capturing module 12 in a wireless or wired manner. The image display module 14 may be a notebook. The image display module 14 comprises a second storage device 22, a display device 24, and a control device 26. The second storage device 22 is used for storing a 3D image and a 2D image or a 3D image comprising a 2D image. The image contents stored in the second storage device 22 vary with different image playback methods. The related description is provided in the following image playback process. Furthermore, the second storage device 22 also stores a set of specification data, such as specification data corresponding to webcams capable of performing an image identification process. The display device 24 is used for playing the 3D image or the 2D image. The display device 24 may be an image display apparatus, such as a TFT-LCD (Thin-Film Transistor Liquid Crystal Display). The control device 26 is used for controlling the display device 24 to play the 3D image or the 2D image according to the first comparison result transmitted from the comparing device 20. In addition, the control device 26 may also be used for comparing a specification of the image capturing module 12 with the set of specification data stored in the second storage device 22 to generate a second comparing result, providing a contour capturing option, determining whether the contour capturing option is on, and determining whether to start the contour capturing device 16 to capture the glasses contour image in the predetermined range according to the second comparison result and the determined result. The control device 26 may be image playback software.

Figure 2:
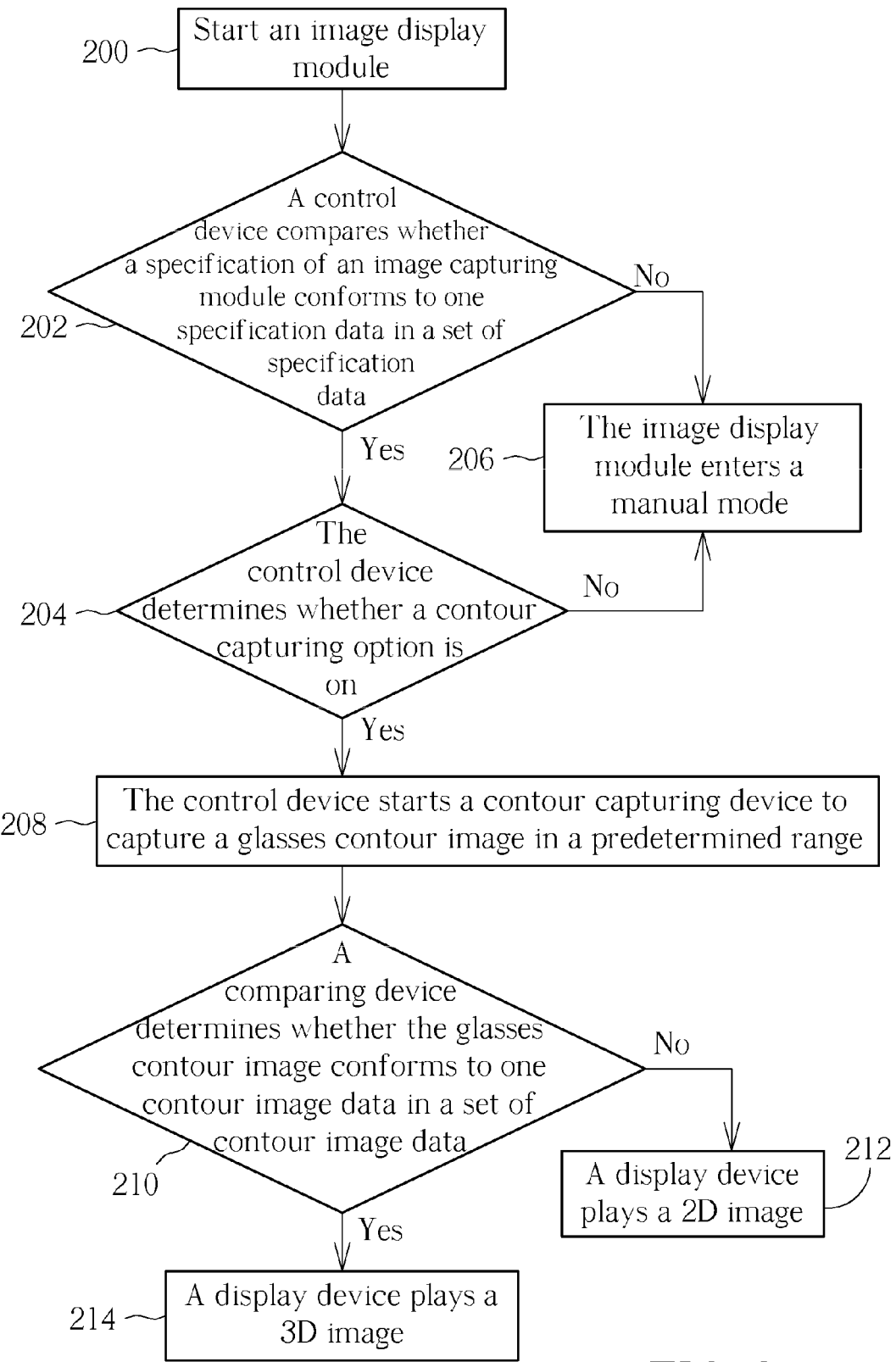
FIG. 2 is a flowchart of an image playback method based on a data comparison result according to one embodiment of the present invention.

Next, please refer to FIG. 2, which is a flowchart of an image playback method based on a data comparison result according to one embodiment of the present invention. The image playback method comprises the following processes.

Step 200: Start the image display module 14;

Step 202: The control device 26 determines whether the specification of the image capturing module 12 conforms to one specification data in the set of specification data stored in the second storage device 22. If so, go to Step 204; if not, go to Step 206;

Step 204: The control device 26 determines whether the contour capturing option is on or not. If so, go to Step 208; if not, go to Step 206;

Step 206: The image display module 14 enters a manual mode;

Step 208: The control device 26 starts the contour capturing device 16 to capture the glasses contour image in the predetermined range;

Step 210: The comparing device 20 determines whether the glasses contour image captured by the contour capturing device 16 conforms to one contour image data in the set of contour image data stored in the first storage device 18. If so, go to Step 214; if not, go to Step 212;

Step 212: The control device 26 controls the display device 24 of the image display module 14 to play the 2D image;

Step 214: The control device 26 controls the display device 24 of the image display module 14 to play the 3D image.

More detailed description for the image playback system 10 is provided as follows. When a user wants to view images via the image playback system 10, the user may need to start the image display module 14 first (Step 200). Next, the control device 26 in the image display module 14 may start to determine whether the specification of the image capturing module 12 connected to the image display module 14 conforms to the set of specification data stored in the second storage device 22 (Step 202). For example, the control device 26 may extract the specification of the image capturing module 12 based on hardware information provided from an API (Advanced Programmer Interface) of a driver program installed in the image display module 14 and compare the extracted specification of the image capturing module 12 with the set of specification data stored in the second storage device 22. As mentioned above, the set of specification data corresponds to webcams capable of performing an image identification process. That is to say, the objective of Step 202 is to determine whether the image capturing module 12 is capable of performing the subsequent image identification processes. When the specification of the image capturing module 12 does not conform to any specification data in the set of specification data, which means the image capturing module 12 does not have an image identification function, the image display module 14 may enter a manual mode automatically. In the manual mode, if the user wants to view images stored in the image display module 14, the user may need to execute the related operations manually, such as pressing a "Play" button. On the other hand, when the specification of the image capturing module 12 conforms to one specification data in the set of specification data, Step 204 may be performed accordingly. In Step 204, the control device 26 may provide the contour capturing option. The contour capturing option may be activated in advance or by the user himself. After the control device 26 determines that the specification of the image capturing module 12 conforms to one specification data in the set of specification data, the control device 26 may continue to determine whether the contour capturing option is on so that a determined result may be generated accordingly. Then, the control device 26 may determine whether to start the contour capturing device 16 to capture the glasses contour image in the predetermined range according to the determined result. That is to say, when the control device 26 determines that the contour capturing option is off, the image display module 14 may enter the manual mode (Step 206). On the contrary, when the control device 26 determines that the contour capturing option is on, the control device 26 may start the contour capturing device 16 to capture the glasses contour image in the predetermined range (Step 208) so that the subsequent image identification processes may be continued. The predetermined range may be preferably a range of the user's face. The method for capturing the glasses contour image mentioned in Step 208 is a common image capturing technology in the prior art, such as a background subtraction method, an adjacent image difference method, an optic flow method, and so on. For example, the contour capturing device 16 may separate the glasses contour image from the user-face image via the background subtraction method. The background subtraction method involves performing a difference operation on a background image with no moving objects (i.e. a user-face image without a pair of 3D glasses worn) and a current image (i.e. a user-face image with a pair of 3D glasses worn) in a field of view and performing a two-valued operation on the difference result to obtain an area with moving objects (i.e. the glasses contour image).

After the glasses contour image is captured by the contour capturing device 16, the comparing device 20 may start to determine whether or not the glasses contour image conforms to one contour image data in the set of contour image data stored in the first storage device 18 (Step 210). As mentioned above, the set of contour image data stored in the first storage device 18 corresponds to the contour image data of at least one pair of 3D glasses, meaning that the set of contour image data comprises contour images of 3D glasses which are suitable for 3D display technologies utilized in the image display module 14, such as different kinds of polarizing glasses. When the comparing device 20 determines that the glasses contour image does not conform to any contour image data in the set of contour image data, it means that the glasses contour image may simply be a pair of glasses for nearsightedness worn by the user. As a result, the control device 26 may control the display device 24 to play the 2D image (Step 212). On the contrary, when the comparing device 20 determines that the glasses contour image conforms to one contour image data in the set of contour image data, it means that the user has worn a pair of corresponding polarizing glasses. Thus, the control device 26 may control the display device 24 to play the 3D image (Step 214).

The present invention may utilize a 3D image display technology commonly used in the prior art for the 3D image playback process. Take the display technology disclosed in the Taiwan patent application No. 097134826, which is addressed by Wintron Corporation, for an example. The display technology disclosed in the Taiwan patent application No. 097134826 involves changing polarization angles of polarized images for 3D image display. To be brief, the display technology involves controlling a power source to modify arrangement of liquid crystal molecules in a liquid crystal layer, and then offsetting polarization angles of passed polarized images to achieve the purpose of different eyes viewing images with different visual angles when a user wears a pair of corresponding polarizing glasses. Thus, when the control device 26 controls the display device 24 to display the 3D image, the display device 24 may output a first set of images and a second set of images of the 3D image stored in the second storage device 22 sequentially. It should be noted that the content of the first set of images and the content of the second set of images are substantially identical but differ in the visual angles. In other words, the first set of images is recorded according to the visual angles of the user's left eye, and the second set of images is recorded according to the visual angles of the user's right eye. As mentioned above, the display device 24 may be a thin-film transistor liquid crystal display. As a result, the first set of images and the second set of images may be polarized after passing through the first liquid crystal layer in the display device 24. It is assumed that the first set of images and the second set of images are the horizontal polarization images, and the display device 24 shows the first set of images and the second set of images sequentially in turn at a display speed of thirty frames per second. Subsequently, the display device 24 may control the power source to modify arrangement of liquid crystal molecules in the second liquid crystal layer of the display device 24 for allowing the first set of images to be the horizontal polarization images after passing through the second liquid crystal layer of the display device 24 and polarizing the second set of images into the vertical polarization images after passing through the second liquid crystal layer of the display device 24. Thus, the user's left eye may view the first set of images transmitted from the display device 24 via the left horizontal polarization lens, and the user's right eye may view the second set of images transmitted from the display device 24 via the right vertical polarization lens. In such a manner, the first set of images and the second set of images may be matched as continuous 3D images by vision persistence in the user's brain at the display speed of thirty frames per second of the display device 24. On the other hand, when the control device 26 controls the display device 24 to play the 2D image, the display device 24 may only output the first set of images or the second set of images for 2D image display. As a result, the user may view the 2D image output by the display device 24 without wearing a pair of 3D glasses. Furthermore, an image data storing method may be not limited to the aforementioned method. For example, the second storage device 22 may also store the 3D image and the 2D image at the same time. When the display device 24 needs to perform a 2D image display function, the control device 26 may control the display device 24 to play the 2D image. When the display device 24 needs to perform a 3D image display function, the control device 26 may control the display device 24 to play the 3D image. In such a manner, the related image display control process may be simplified.

In addition, it should be noted that Step 202 and Step 204 may be optional steps. That is to say, after the user starts the image display module 14, the image playback system 10 of the present invention may control the image capturing module 12 to perform Step 208 directly, or perform one of Step 202 and Step 204.

Compared with the prior art, in which manual control of image display is necessary, the image playback system provided by the embodiments of the present invention may allow the image display module to play 3D images or 2D images automatically based on the 3D glasses image identification result generated from the image capturing module. In other words, if the image capturing module determines that the user wears a pair of corresponding 3D glasses, the image display module may play the 3D images automatically for the user. On the contrary, if the image capturing module determines that the user does not wear a pair of corresponding 3D glasses, the image display module may only play the 2D images. In summary, the image playback system of the embodiments of the present invention allows the user to control the image display module to enter a 3D display mode or a 2D display mode via an action of wearing a pair of corresponding 3D glasses instead of complicated software and hardware operations mentioned in the prior art (e.g. pressing a "Play" button or manually switching the playback modes of the image playback software). Thus, convenience of a 3D image playback system in use may be increased considerably according to the embodiments of the present invention.

Those skilled in the art will readily observe that numerous modifications and alterations of the device and method may be made while retaining the teachings of the invention.

What is claimed is:

1. A method for playing images according to a data comparison result, the method comprising:
   starting an image display module;
   storing a set of specification data corresponding to webcams capable of performing an image identification process in the image display module;
   comparing a specification of an image capturing module with the set of specification data;
   the image display module determining whether to start the image capturing module to capture a glasses contour image in a predetermined range according to a comparison result of the specification of the image capturing module with the set of specification data;
   capturing the glasses contour image by the image capturing module in the predetermined range;
   comparing the glasses contour image captured by the image capturing module with a set of contour image data; and
   the image display module playing a 3D image or a 2D image according to a comparison result of the glasses contour image captured by the image capturing module with the set of contour image data.

2. The method of claim 1, wherein the image display module plays the 3D image if the glasses contour image conforms to one data in the set of contour image data.

3. The method of claim 1, wherein the image display module plays the 2D image if the glasses contour image does not conform to any data in the set of contour image data.

4. The method of claim 1 further comprising:
storing the 3D image and the 2D image in the image display module.

5. The method of claim 1 further comprising:
storing the 3D image in the image display module, the 3D image comprising the 2D image.

6. The method of claim 1, wherein the image display module starts the image capturing module to capture the glasses contour image in the predetermined range when the specification of the image capturing module conforms to one specification data in the set of the specification data.

7. The method of claim 1 further comprising:
the image display module providing a contour capturing option;
the image display module determining whether the contour capturing option is on; and
the image display module determining whether to start the image capturing module to capture the glasses contour image in the predetermined range according to the determined result.

8. The method of claim 7, wherein the image display module starts the image capturing module to capture the glasses contour image in the predetermined range when the contour capturing option is on.

9. An image playback system capable of capturing glasses contour images, the image playback system comprising:
an image capturing module comprising:
a contour capturing device for capturing a glasses contour image in a predetermined range;
a first storage device for storing a set of contour image data corresponding to at least one pair of 3D glasses; and
a comparing device for comparing the glasses contour image in the predetermined range captured by the contour capturing device with the set of contour image data; and
an image display module comprising:
a second storage device for storing a set of specification data corresponding to webcams capable of performing an image identification process;
a display device for playing a 3D image or a 2D image; and
a control device for comparing a specification of the image capturing module with the set of specification data and determining whether to start the contour capturing device to capture the glasses contour image in the predetermined range according to a comparison result of the specification of the image capturing module with the set of specification data, and further for controlling the display device to play the 3D image or the 2D image according to a comparison result of the glasses contour image in the predetermined range captured by the contour capturing device with the set of contour image data transmitted from the comparing device.

10. The image playback system of claim 9, wherein the image display module further comprises a second storage device for storing the 3D image and the 2D image.

11. The image playback system of claim 9, wherein the image display module further comprises a second storage device for storing the 3D image, the 3D image comprising the 2D image.

12. The image playback system of claim 9, wherein the control device controls the display device to play the 3D image when the glasses contour image in the predetermined range captured by the contour capturing device conforms to one contour image data in the set of contour image data.

13. The image playback system of claim 9, wherein the control device controls the display device to play the 2D image when the glasses contour image in the predetermined range captured by the contour capturing device does not conform to any contour image data in the set of contour image data.

14. The image playback system of claim 9, wherein the control device starts the contour capturing device to capture the glasses contour image in the predetermined range when the specification of the image capturing module conforms to one specification data in the set of specification data.

15. The image playback system of claim 9, wherein the control device is used for providing a contour capturing option, determining whether the contour capturing option is on, and determining whether to start the contour capturing device to capture the glasses contour image in the predetermined range according to the determined result.

16. The image playback system of claim 15, wherein the control device starts the contour capturing device to capture the glasses contour image in the predetermined range when the contour capturing option is on.

17. The image playback system of claim 9, wherein the image capturing module is a webcam, and the contour capturing device is an image capturing lens of the webcam.

18. The image playback system of claim 9, wherein the control device is image playback software.

19. The image playback system of claim 9, wherein the display device is a TFT-LCD.

20. The image playback system of claim 9, wherein the comparing device is contour image comparing software.

21. The image playback system of claim 9, wherein the image display module is a notebook.

* * * * *